United States Patent Office 2,877,240
Patented Mar. 10, 1959

2,877,240

6-FLUORO-17β-HYDROXY-17α-LOWER ALIPHATIC HYDROCARBON - 1,4 - ANDROSTADIENES AND 6-FLUORO-17α-LOWER ALIPHATIC HYDROCARBON ESTRADIOLS

J Allan Campbell, Kalamazoo Township, Kalamazoo County, Raymond L. Pederson, Kalamazoo, John C. Babcock, Portage Township, Kalamazoo County, and John A. Hogg, Kalamazoo Township, Kalamazoo County, Mich., assignors to The Upjohn Company, Kalamazoo, Mich., a corporation of Michigan No Drawing. Application June 9, 1958
Serial No. 740,551

24 Claims. (Cl. 260—397.4)

This invention relates to new 6α- and 6β-fluoro steroids and is more particularly concerned with 6-fluoro-17β-hydroxy-17α-lower aliphatic hydrocarbon-1,4-androstadien-3-ones and the 17-acylates thereof, 6-fluoro-17α-lower aliphatic hydrocarbon estradiols and the 17-acylates thereof and methods used in the preparation thereof.

The novel steroids of this invention, the compounds of Formulae II and III, depicted and described in greater detail below, possess useful therapeutic properties. The compounds of Formulae II and III having a 17α-alkyl group possess the ability to modify the secretion of gonadotropins and in addition exhibit androgenic, anabolic and central nervous system regulating activity. The compounds of Formulae II and III possessing the 17α-C≡CR$_3$ grouping affect the secretion of gonadotropins and thus regulate ovulation and endometrial and placental development and, particularly when used in conjunction with androgens, e. g., 9α-fluoro-11β-hydroxy-17-methyltestosterone, reduce fertility and are useful for the treatment of dysmenorrhea, amenorrhea, endometriosis, threatened abortion and related gynecological disorders. In addition, the compounds of Formula III are estrogenic and affect blood lipids, thus making them useful as anti-atherosclerotic agents.

Administration of the steroids of Formulae II and III can be in conventional dosage forms such as pills, tablets, capsules, syrups, or elixirs for oral use, or in liquid forms which are adaptable to the natural and synthetic steroid hormones for injectable products.

The novel compounds of this invention are prepared according to the following reaction scheme:

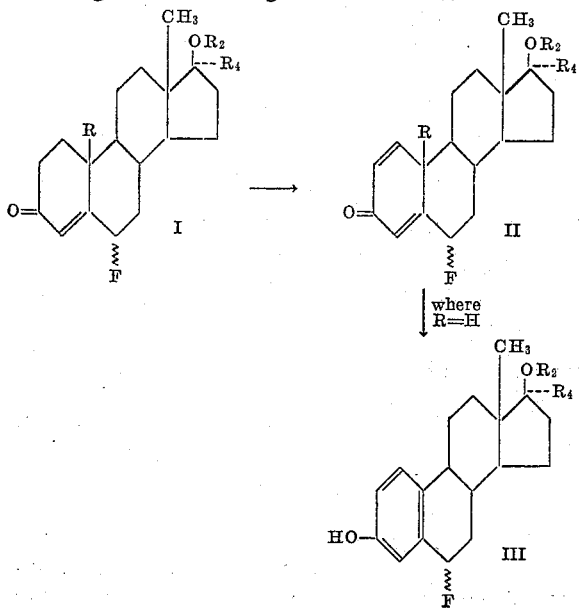

wherein R represents methyl or hydrogen, R$_2$ represents hydrogen or the acyl radical of an organic carboxylic acid, preferably a hydrocarbon carboxylic acid, containing from one to twelve carbon atoms, inclusive, and R$_4$ represents a lower aliphatic hydrocarbon radical. The term lower-aliphatic hydrocarbon radical as used herein refers to an alkyl radical of from one to six carbon atoms, inclusive, e. g., methyl, ethyl, propyl, butyl, amyl, hexyl, isopropyl, 3-methylpentyl, and the like, or an alkynyl radical of the structure —C≡CR$_3$, wherein R$_3$ is hydrogen or an alkyl radical of from one to four carbon atoms, inclusive, e. g., methyl, ethyl, propyl, isopropyl, butyl, isobutyl, and tertiary butyl.

The 17α-substituent, designated as R$_4$ in the formulae of the foregoing reaction scheme, is referred to in this application as "alkyl." It is to be understood that the substituent has the value given hereinabove, i. e., an aliphatic hydrocarbon radical containing from one to six carbon atoms, inclusive.

In this application the wavy line ($\xi$) appearing at the 6-position is a generic expression inclusive of the alpha (α) and beta (β) configuration.

The starting steroids for the processes of the present invention, the compounds of Formula I, e. g., 6-fluoro-17β-hydroxy-17α-alkyl-4-androsten-3-ones and the 17-acylates thereof and 6-fluoro-17β-hydroxy-17α-alkyl-19-nor-4-androsten-3-ones and the 17-acylates thereof are disclosed in our copending application Serial No. 699,502, filed November 29, 1957, now Patent Number 2,838,500.

One of the processes of the present invention comprises the fermentative or chemical dehydrogenation of the compounds of Formula I (where R is methyl), for example, 6 - fluoro-17β-hydroxy-17α-alkyl-4-androsten-3-ones and the 17-acylates thereof, to obtain the compounds of Formula II (where R is methyl), for example, 6-fluoro-17β-hydroxy-17α-alkyl-1,4-androstadien-3-ones and the 17-acylates thereof.

Fermentative dehydrogenation of the compounds of Formula I (where R is methyl), such as 6-fluoro-17β-hydroxy-17α-alkyl-4-androsten-3-ones and the 17-acylates thereof, comprises the use of microorganisms such as Septomyxa, Corynebacterium, Fusarium, and the like, under fermentation conditions well known in the art (e. g., U. S. 2,602,769) and furthermore illustrated in the examples below. When the starting steroid contains a —C≡CR$_3$ group in the 17-position and Septomyxa is used to effect 1-dehydrogenation, it is found to be advantageous to use with the substrate and medium a steroid promoter, such as progesterone, 3-ketobisnor-4-cholen-22-al, 3-ketobisnorcholenic acid, 11β,21-dihydroxy-1,4,17-(20)-pregnatrien-3-one, and the like.

The free alcohols are usually employed as starting material in the fermentative dehydrogenation process since dehydrogenation using microorganisms generally effects saponification of the 17-ester group. However, the 17-acylates, for example, the 17-acetate, the 17-propionate, and the like, of 6-fluoro-17β-hydroxy-17α-alkyl-4-androsten-3-ones can be used as starting material. The products obtained by the fermentative dehydrogenation of the compounds of Formula I (where R is methyl) are 6 - fluoro-17β-hydroxy-17α-alkyl-1,4-androstadien-3-ones, the compounds of Formula II, which, if desired, can be acylated to obtain the corresponding 17-acylates thereof.

The acylation is carried out in known manner by allowing 6 - fluoro - 17β - hydroxy - 17α - alkyl - 1,4 - androstadien-3-ones to react with the anhydride of an organic carboxylic acid, particularly a hydrocarbon carboxylic acid containing from one to twelve carbons, inclusive, for example, a saturated straight-chain aliphatic acid, e. g., acetic, propionic, butyric, valeric, hexanoic, lauric, a saturated branched-chain aliphatic acid, e. g., trimethylacetic, isobutyric, isovaleric, a cycloaliphatic saturated acid, e. g., cyclohexane-carboxylic, an alkaryl acid, e. g., benzoic, phenylacetic, 2-phenylpropionic, o-, m-, and p-toluic, a saturated dibasic acid (which can be converted into water-soluble, e. g., sodium, salts), e. g., succinic, adipic, a monobasic unsaturated acid, e. g., acrylic, crotonic, undecylenic, propiolic, cinnamic, a dibasic unsaturated acid (which can be converted into water-soluble, e. g., sodium, salts), e. g., maleic and citraconic. If the corresponding acylating agent is solid, an inert solvent such as toluene, xylene or dioxane can be added to effect solution and to provide a liquid esterification medium.

Chemical dehydrogenation of the compounds of Formula I (where R is methyl) to produce the compounds of Formula II (where R is methyl) can be carried out with selenium dioxide according to procedures well known in the art and further illustrated in the examples below.

Fermentative dehydrogenation of the compounds of Formula I (where R is hydrogen), such as 6-fluoro-17$\beta$-hydroxy - 17$\alpha$ - alkyl - 19 - nor - 4 - androsten - 3 - ones and the 17-acylates thereof, is carried out in the same manner as described above for the fermentative dehydrogenation of the compounds of Formula I (where R is methyl). The compounds of Formula II (where R is hydrogen), such as 6-fluoro-17$\beta$-hydroxy-17$\alpha$-alkyl-19-nor-1,4-androstadien-3-ones produced by the fermentative dehydrogenation, are unstable and spontaneously rearrange to produce the compounds of Formula III, such as 6-fluoro-17$\alpha$-alkylestradiols. If the 17-acylates of 6-fluoro-17$\beta$ - hydroxy - 17$\alpha$ - alkyl - 19 - nor - 4 - androsten - 3 - ones are used as the starting materials, saponification of the 17-ester group is generally effected.

The 17-acylates of the 6-fluoro-17$\alpha$-alkylestradiols are obtained in the following manner: the 6-fluoro-17$\alpha$-alkylestradiols are acylated, according to the procedure described above for the acylation of 6-fluoro-17$\beta$-hydroxy-17$\alpha$-alkyl-1,4-androstadien-3-ones, to obtain the corresponding 6 - fluoro - 17$\alpha$ - alkylestradiol 3,17$\beta$ - diacylates. The said 3,17$\beta$-diacylates are then converted to 6-fluoro-17$\alpha$-alkylestradiol 17-acylates by substituting the said 3,17-diacylates for the estradiol 3,17-diacylate disclosed in Example 2 of U. S. Patent 2,611,733 and following the procedure disclosed therein selectively saponifying the acyl group at the 3-position.

Chemical dehydrogenation of the compounds of Formula I (where R is hydrogen) to obtain the compounds of Formula III is carried out in the same manner described above for the conversion of the compounds of Formula I (where R is methyl) to the compounds of Formula II (where R is methyl). Here, as in the fermentative dehydrogenation, the compounds of Formula II (where R is hydrogen), such as 6-fluoro-17$\beta$-hydroxy-17$\alpha$ - alkyl - 19 - nor - 1,4 - androstadien - 3 - ones and the 17-acylates thereof, are unstable and spontaneously rearrange to produce the compounds of Formula III, such as 6 - fluoro-17$\alpha$ - alkylestradiols and the 17 - acylates thereof.

The foregoing compounds of Formulae I, II and III are all characterized by the presence of a 6-fluoro substituent. It should be noted that the configuration of the fluorine at the 6-position can be either 6$\alpha$ or 6$\beta$. Thus, substituting a 6$\beta$-fluoro steroid as the starting material and following the procedures hereinbefore described and as exemplified below, while maintaining near neutral reaction conditions, there is produced as the final product of each example the corresponding 6$\beta$-epimer. Where the 6$\beta$-epimer or a mixture predominating therein is employed as the starting material, any subsequent reaction product can be isolated either as the 6$\beta$-epimer or the aforesaid mixture of 6$\alpha$- and 6$\beta$-epimers. A 6$\alpha$-epimerized product can be obtained by treatment of the 6$\beta$-epimer or a mixture of the 6$\alpha$- and 6$\beta$-epimers at temperatures of zero degrees centigrade, or slightly higher or lower temperatures, in an organic solvent, such as chloroform, methylene chloride, ether, and the like, and in the presence of a prototropic agent (proton-donating agent) such as alcohols, organic acids, and the like, with a mineral acid, such as hydrogen chloride. The mixture should preferably be maintained at a temperature of zero degrees centigrade, although slightly higher or lower temperatures can be used, during the addition of the acid. The reaction mixture can then be washed with successive portions of dilute alkali and water, and then dried and evaporated under reduced pressure. The 6$\alpha$-fluoro products can be recovered from the crude reaction product and purified by recrystallization.

Alternatively, the epimerization can be accomplished with alkali. Bases, for example, solutions of sodium hydroxide and potassium hydroxide, may be used to treat the 6$\beta$-epimer in solution in an organic solvent, such as methanol, to produce the 6$\alpha$-epimer.

The following examples are illustrative of the process and products of the present invention, but are not to be construed as limiting. In the examples which follow, the Roman numeral following the name of a compound is used to indicate the relation of the compound to the reaction scheme depicted and described above.

EXAMPLE 1

6$\alpha$ - fluoro - 17$\beta$ - hydroxy - 17$\alpha$ - methyl - 1,4 - androstadien-3-one (II) (biological dehydrogenation)

Five 100-milliliter portions of a medium, in 250-milliliter Erlenmeyer flasks, containing one percent glucose, two percent corn steep liquor (sixty percent solids) and tap water, are adjusted to a pH of 4.9. This medium is sterilized for 45 minutes at fifteen pounds per square inch pressure and inoculated with a one to two day vegetative growth of Septomyxa affinis A. T. C. C. 6737. The Erlenmeyer flasks are shaken at room temperature (about 26 to 28 degrees centigrade) for a period of three days. At the end of this period this 500-milliliter volume is used as an inoculum for ten liters of the same glucose-corn steep liquor medium which in addition contains five milliliters of an antifoam compound (a mixture of lard oil and octadecanol). The fermentor is placed into the water-bath, adjusted to 28 degrees centigrade and the contents stirred thoroughly (300 R. P. M.) and aerated (0.2 liter of air per minute to ten liters of beer). After twenty hours of incubation, when a good growth has been developed, one gram of 6$\alpha$-fluoro-17$\beta$-hydroxy-17$\alpha$-methyl-4-androsten-3-one (I) in sixteen milliliters of dimethylformamide is added and the incubation carried out at the same temperature (28 degrees centigrade) and aeration for a period of 36 hours (final pH 8.3). The mycelium is filtered off and extracted with three 200-milliliter portions of acetone. The beer is extracted with three one-liter portions of methylene chloride and thereupon the acetone extracts and the extracts of the beer are combined, dried over anhydrous sodium sulfate and evaporated and the resulting residue chromatographed over a Florisil anhydrous magnesium silicate column, which on elution with seven percent acetone in Skellysolve B hexanes and evaporation of the solvent, affords solid residues. The residues are combined and recrystallized from methylene chloride containing Skellysolve B hexanes to give 6$\alpha$-fluoro-17$\beta$-hydroxy-17$\alpha$-methyl-1,4-androstadien-3-one (II), a crystalline solid.

Instead of Septomyxa, species of other genera such as Corynebacterium, Didymella, Calonectria, Alternaria, Colletotrichum, Cylindrocarpon, Ophiobolus, Fusarium, Listeria, Erysipelothrix, Mycobacterium, Tricothecium, Leptosphaeria, Cucurbitaria, Nocardia, and enzymes of fungi of the family Tuberculariaceae can be used to introduce a $\Delta^1$-bond into 6$\alpha$-fluoro-17$\beta$-hydroxy-17$\alpha$-methyl-4-androsten-3-one.

Similarly, other 6$\alpha$-fluoro-17$\beta$-hydroxy-17$\alpha$-alkyl-4-androsten-3-ones, for example, 6$\alpha$-fluoro-17$\beta$-hydroxy-17$\alpha$-ethyl-4-androsten-3-one, can be substituted for 6$\alpha$- fluoro-17β-hydroxy-17α-methyl-4-androsten-3-one to obtain the corresponding 6α-fluoro-17β-hydroxy-17α-alkyl-1,4-androstadien-3-ones, for example, 6α-fluoro-17β-hydroxy-17α-ethyl-1,4-androstadien-3-one.

Instead of 6α-fluoro-17β-hydroxy-17α-methyl-4-androsten-3-one (and other 6α-fluoro-17β-hydroxy-17α-alkyl-4-androsten-3-ones), the 17-esters thereof can be used such as the 17-acetate, the 17-propionate, the 17-butyrate, 17-isobutyrate and the like. However, in these cases the ester group is generally saponified during the fermentation process.

EXAMPLE 2

6α - fluoro - 17β - hydroxy - 17α - methyl - 1,4 - androstadien-3-one 17-acetate (II)

One gram of 6α-fluoro-17β-hydroxy-17α-methyl-1,4-androstadien-3-one is dissolved in nine milliliters of acetic anhydride and warmed under reflux for about one-half hour. The reaction mixture is then distilled under reduced pressure to remove unreacted acetic anhydride. The crystalline material remaining after the distillation is then recrystallized from aqueous methanol to give crystals of 6α-fluoro-17β-hydroxy-17α-methyl-1,4-androstadien-3-one 17-acetate (II).

Similarly, by reacting 6α-fluoro-17β-hydroxy-17α-methyl-1,4-androstadien-3-one with the appropriate hydrocarbon carboxylic acid anhydride, for example, at temperatures between about 120 and 150 degrees centigrade, there are produced other 17-acylates of 6α-fluoro-17β-hydroxy-17α-methyl-1,4-androstadien-3-one such as 6α - fluoro - 17β - hydroxy - 17α - methyl - 1,4 - androstadien-3-one 17-propionate, 6α-fluoro-17β-hydroxy-17α-methyl-1,4-androstadien-3-one 17-butyrate, 6α-fluoro-17β-hydroxy-17α-methyl-1,4-androstadien-3-one 17-valerate, 6α - fluoro - 17β - hydroxy - 17α - methyl - 1,4 - androstadien-3-one 17-hexanoate, 6α-fluoro-17β-hydroxy-17α-methyl-1,4-androstadien-3-one 17-laurate, 6α-fluoro-17β-hydroxy - 17α - methyl - 1,4 - androstadien - 3 - one 17-trimethylacetate, 6α-fluoro-17β-hydroxy-17α-methyl-1,4-androstadien - 3 - one 17 - isobutyrate, 6α - fluoro - 17β - hydroxy - 17α - methyl - 1,4 - androstadien - 3 - one 17-isovalerate, 6α - fluoro - 17β - hydroxy - 17α - methyl-1,4-androstadien-3-one 17-cyclohexanecarboxylate, 6α-fluoro - 17β - hydroxy - 17α - methyl - 1,4 - androstadien-3-one 17-benzoate, 6α-fluoro-17β-hydroxy-17α-methyl-1,4-androstadien-3-one 17-phenylacetate, 6α-fluoro-17β-hydroxy - 17α - methyl - 1,4 - androstadien - 3 - one 17-(β - phenylpropionate), 6α - fluoro - 17β - hydroxy-17α-methyl-1,4-androstadien-3-one 17-(o-, m-, p-toluate), 6α - fluoro - 17β - hydroxy - 17α - methyl - 1,4 - androstadien-3-one 17-hemisuccinate, 6α-fluoro-17β-hydroxy-17α-methyl-1,4-androstadien-3-one 17-hemiadipate, 6α-fluoro - 17β - hydroxy - 17α - methyl - 1,4 - androstadien-3-one 17-acrylate, 6α-fluoro-17β-hydroxy-17α-methyl-1,4-androstadien-3-one 17-crotonate, 6α-fluoro-17β-hydroxy-17α-methyl-1,4-androstadien-3-one 17-undecylenate, 6α-fluoro - 17β - hydroxy - 17α - methyl - 1,4 - androstadien-3-one 17-propiolate, 6α-fluoro-17β-hydroxy-17α-methyl-1,4-androstadien-3-one 17-cinnamate, 6α-fluoro-17β-hydroxy-17α methyl-1,4-androstadien-3-one 17-maleate, and 6α - fluoro - 17β - hydroxy - 17α - methyl - 1,4 - androstadien-3-one 17-citraconate.

If the corresponding acylating agent is solid, an inert solvent such as toluene, xylene or dioxane can be added to effect solution and to provide a liquid esterification medium.

Likewise, by reacting other 6α-fluoro-17β-hydroxy-17α-alkyl-1,4-androstadien-3-ones with the appropriate hydrocarbon carboxylic acid, such as those named above, there are produced other 17-acylates of 6α-fluoro-17β-hydroxy-17α-alkyl-1,4-androstadien-3-ones such as, for example, the 17-propionate, the 17-hemisuccinate, and the 17-benzoate.

EXAMPLE 3

6α-fluoro-17β-hydroxy-17α-methyl-1,4-androstadien-3-one (II) (chemical dehydrogenation)

A mixture of 704 milligrams of 6α-fluoro-17β-hydroxy-17α-methyl-4-androsten-3-one (I) dissolved in 13.5 milliliters of tertiary butyl alcohol and 0.135 milliliter of acetic acid was heated together with 293 milligrams of selenium dioxide at reflux, with stirring, for a period of five and one-half hours. Thereafter ninety milligrams of selenium dioxide were added and the mixture heated under reflux, with stirring, for a further period of twelve hours. The mixture was then cooled, filtered to remove the selenium dioxide and evaporated. The residue was dissolved in fifty milliliters of methylene chloride, washed with water, four times with a saturated sodium bicarbonate solution, again with water, dried over sodium sulfate and evaporated to dryness. The residue was dissolved in fifty milliliters of benzene and chromatographed on 75 grams of Florisil (synthetic magnesium silicate). The chromatographic column was eluted in 45-milliliter fractions as follows:

Fractions 1–22—Skellysolve B hexanes plus five percent acetone

Fractions 23–45—Skellysolve B hexanes plus six percent acetone

Fractions 46–68—Skellysolve B hexanes plus seven percent acetone

Fractions 69–91—Skellysolve B hexanes plus eight percent acetone

The residues from fractions 63 through 81 were combined to give 195 milligrams of product which was recrystallized from methylene chloride-Skellysolve B hexanes to give 141 milligrams of 6α-fluoro-17β-hydroxy-17α-methyl-1,4-androstadien-3-one (II), melting at 161–163 degrees centigrade.

Analysis.—Calcd. for $C_{20}H_{27}FO_2$: C, 75.43; H, 8.55. Found: C, 75.47; H, 8.74.

The infrared absorption (Nujol mull) exhibited bands at 348 cm.$^{-1}$ (hydroxy), 1669 cm.$^{-1}$ (α,β-unsaturated ketone), and 1626, 1614 cm.$^{-1}$ (double bond).

Similarly, other 6α-fluoro-17β-hydroxy-17α-alkyl-4-androsten-3-ones, for example, 6α-fluoro-17β-hydroxy-17α-ethyl-4-androsten-3-one, can be substituted for 6α-fluoro-17β-hydroxy-17α-methyl-4-androsten-3-one to obtain the corresponding 6α-fluoro-17β-hydroxy-17α-alkyl-1,4-androstadien-3-ones, for example, 6α-fluoro-17β-hydroxy-17α-ethyl-1,4-androstadien-3-one.

EXAMPLE 4

6α-fluoro-17β-hydroxy-17α-methyl-1,4-androstadien-3-one 17-acetate (II) (chemical dehydrogenation)

Substituting 6α-fluoro-17β-hydroxy-17α-methyl-4-androsten-3-one 17-acetate (and other 6α-fluoro-17β-hydroxy-17α-alkyl-4-androsten-3-one 17-acylates) for 6α-fluoro-17β-hydroxy-17α-methyl-4-androsten-3-one and following the procedure of Example 3 is productive of 6α-fluoro-17β-hydroxy-17α-methyl-1,4-androstadien-3-one 17-acetate (and other 6α-fluoro-17β-hydroxy-17α-alkyl-1,4-androstadien-3-one 17-acylates).

EXAMPLE 5

6α-fluoro-17α-methylestradiol (III) (biological dehydrogenation)

Five 100-milliliter portions of a medium, in 250-milliliter Erlenmeyer flasks, containing one percent glucose, two percent corn steep liquor (sixty percent solids) and tap water, are adjusted to a pH of 4.9. This medium is sterilized for 45 minutes at fifteen pounds per square inch pressure and inoculated with a one to two day vegetative growth of Septomyxa affinis A. T. C. C. 6737. The Erlenmeyer flasks are shaken at room temperature (about 26 to 28 degrees centigrade) for a period of three days. At the end of this period this 500-milliliter volume is used as an inoculum for ten liters of the same glucose-corn steep liquor medium which in addition contains five milliliters of an antifoam compound (a mixture of lard oil and octadecanol). The fermentor is placed into the water-bath, adjusted to 28 degrees centigrade and the contents stirred thoroughly (300 R. P. M.) and aerated (0.2 liter of air per minute to ten liters of beer). After twenty hours of incubation, when a good growth has been developed, one gram of 6α-fluoro-17β-hydroxy-17α-methyl-19-nor-4-androsten-3-one (I) in sixteen milliliters of dimethylformamide is added and the incubation carried out at the same temperature (28 degrees centigrade) and the aeration for a period of 36 hours (final pH 8.3). The mycelium is filtered off and extracted with three 200-milliliter portions of acetone. The beer is extracted with three one-liter portions of methylene chloride and thereupon the acetone extracts and the extracts of the beer are combined, dried over anhydrous sodium sulfate and evaporated and the resulting residue chromatographed over a Florisil anhydrous magnesium silicate column, which on elution with increasing proportions of acetone in Skellysolve B hexanes and evaporation of the solvent affords solid residues. Those fractions soluble in ten percent aqueous sodium hydroxide are combined and crystallized from ethyl acetate-Skellysolve B hexanes to give 6α-fluoro-17α-methylestradiol (III), a crystalline solid.

Instead of Septomyxa, species of other genera such as those described in Example 1 can be used to convert 6α-fluoro-17β-hydroxy-17α-methyl-19-nor-4-androsten-3-one to 6α-fluoro-17α-methylestradiol (III). Similarly, other 6α-fluoro-17β-hydroxy-17α-alkyl-19-nor-4-androsten-3-ones, for example, 6α-fluoro-17β-hydroxy-17α-ethyl-19-nor-4-androsten-3-one, can be substituted for 6α-fluoro-17β-hydroxy-17α-methyl-19-nor-4-androsten-3-one to obtain other 6α-fluoro-17α-alkylestradiols, for example, 6α-fluoro-17α-ethylestradiol.

Instead of 6α-fluoro-17β-hydroxy-17α-methyl-19-nor-4-androsten-3-one (and other 6α-fluoro-17β-hydroxy-17α-alkyl-19-nor-4-androsten-3-ones), the 17-esters thereof can be used such as the 17-acetate, the 17-propionate, the 17-butyrate, the 17-isobutyrate, and the like. However, in these cases the ester group is generally saponified during the fermentation process.

EXAMPLE 6

*6α-fluoro-17α-methylestradiol (III) (chemical dehydrogenation)*

A mixture of 100 milligrams of 6α-fluoro-17β-hydroxy-17α-methyl-19-nor-4-androsten-3-one (II) dissolved in six milliliters of tertiary butyl alcohol and 0.55 milliliter of acetic acid is heated together with thirty milligrams of selenium dioxide to approximately 75 degrees centigrade under stirring for a period of about 24 hours. Thereafter another thirty-milligram portion of selenium dioxide is added and the mixture heated under continuous stirring for a further period of about 24 hours. The mixture is then cooled, filtered to remove the selenium dioxide and evaporated. The resulting residue is purified as described in Example 5 to give pure 6α-fluoro-17α-methylestradiol (III), a crystalline solid.

Similarly, other 6α-fluoro-17β-hydroxy-17α-alkyl-19-nor-4-androsten-3-ones, for example, 6α-fluoro-17β-hydroxy-17α-ethyl-19-nor-4-androsten-3-one, can be substituted for 6α-fluoro-17β-hydroxy-17α-methyl-19-nor-4-androsten-3-one to obtain other 6α-fluoro-17α-alkylstestradiols, for example, 6α-fluoro-17α-ethylestradiol.

EXAMPLE 7

*6α-fluoro-17α-methylestradiol 17-acetate (III) (chemical dehydrogenation)*

Substituting 6α-fluoro-17β-hydroxy-17α-methyl-19-nor-4-androsten-3-one 17-acetate (and other 6α-fluoro-17β-hydroxy-17α-alkyl-19-nor-4-androsten-3-one 17-acylates) for 6α-fluoro-17β-hydroxy-17α-methyl-19-nor-4-androsten-3-one and following the procedure of Example 6 is productive of 6α-fluoro-17α-methylestradiol 17-acetate (and other 6α-fluoro-17α-alkylestradiol 17-acylates).

EXAMPLE 8

*6α-fluoro-17β-hydroxy-17α-ethinyl-1,4-androstadien-3-one (II) (biological dehydrogenation)*

Five 100-milliliter portions of a medium, in 250-milliliter Erlenmeyer flasks, containing one percent glucose, two percent corn steep liquor (sixty percent solids) and tap water, are adjusted to a pH of 4.9. This medium is sterilized for 45 minutes at fifteen pounds per square inch pressure and inoculated with a one to two day vegetative growth of *Septomyxa affinis* A. T. C. C. 6737. The Erlenmeyer flasks are shaken at room temperature (about 26 to 28 degrees centigrade) for a period of three days. At the end of this period this 500-milliliter volume is used as an inoculum for ten liters of the same glucose-corn steep liquor medium which in addition contains five milliliters of an antifoam compound (a mixture of lard oil and octadecanol). The fermentor is placed into the water-bath, adjusted to 28 degrees centigrade and the contents stirred thoroughly (300 R. P. M.) and aerated (0.2 liter of air per minute to ten liters of beer). After twenty hours of incubation, when a good growth has been developed, one gram of 6α-fluoro-17β-hydroxy-17α-ethinyl-4-androsten-3-one (I) plus one-half gram of 3-ketobisnor-4-cholen-22-al in sixteen milliliters of dimethylformamide is added and the incubation carried out at the same temperature (28 degrees centigrade) and aeration for a period of 36 hours (final pH 8.3). The mycelium is filtered off and extracted with three 200-milliliter portions of acetone. The beer is extracted with three one-liter portions of methylene chloride and thereupon the acetone extracts and the extracts of the beer are combined, dried over anhydrous sodium sulfate and evaporated and the resulting residue chromatographed over a Florisil anhydrous magnesium silicate column, which on elution with seven to ten percent acetone in Skellysolve B hexanes and evaporation of the solvent affords solid residues. The residues are combined and recrystallized from acetone-Skellysolve B hexanes to give 6α-fluoro-17β-hydroxy-17α-ethinyl-1,4-androstadien-3-one (II), a crystalline solid.

Instead of Septomyxa, species of other genera such as those described in Example 1 can be used to introduce a Δ¹-bond into 6α-fluoro-17β-hydroxy-17α-ethinyl-4-androsten-3-one.

Similarly, other 6α-fluoro-17β-hydroxy-17α-alkynyl-4-androsten-3-ones, for example, 6α-fluoro-17β-hydroxy-17α-methylethinyl-4-androsten-3-one, can be substituted for 6α-fluoro-17β-hydroxy-17α-ethinyl-4-androsten-3-one to obtain the corresponding 6α-fluoro-17β-hydroxy-17α-alkynyl-1,4-androstadien-3-ones, for example, 6α-fluoro-17α-methylethinyl-1,4-androstadien-3-one.

Instead of 6α-fluoro-17β-hydroxy-17α-ethinyl-4-androsten-3-one (and other 6α-fluoro-17β-hydroxy-17α-alkynyl-4-androsten-3-ones), the 17-esters thereof can be used such as the 17-acetate, the 17-propionate, the 17-butyrate, the 17-isobutyrate, and the like. However, in these cases the ester group is generally saponified during the fermentation process.

EXAMPLE 9

*6α-fluoro-17β-hydroxy-17α-ethinyl-1,4-androstadien-3-one-17-acetate (II)*

One gram of 6α-fluoro-17β-hydroxy-17α-ethinyl-1,4-androstadiene-3-one is dissolved in nine milliliters of acetic anhydride and warmed under reflux for about one-half hour. The reaction mixture is then distilled under reduced pressure to remove unreacted acetic anhydride. The crystalline material remaining after the distillation is then recrystallized from aqueous methanol to give crystals of 6α-fluoro-17β-hydroxy-17α-ethinyl-1,4-androstadien-3-one 17-acetate (II).

Similarly, by reacting 6α-fluoro-17β-hydroxy-17α-ethinyl-1,4-androstadien-3-one with the appropriate hydrocarbon carboxylic acid anhydride, for example at temperatures between about 120 and 150 degrees centigrade, there are produced other 17-acylates of 6α-fluoro-17β-hydroxy-17α-ethinyl-1,4-androstadien-3-one such as 6α-fluoro-17β-hydroxy-17α-ethinyl - 1,4 - androstadien-3-one 17-propionate, 6α-fluoro-17β-hydroxy-17α-ethinyl-1,4-androstadien-3-one 17-butyrate, 6α-fluoro-17β-hydroxy-17α-ethinyl-1,4-androstadien-3-one 17-valerate, 6α-fluoro-17β-hydroxy-17α-ethinyl-1,4-androstadien-3-one 17-hexanoate, 6α-fluoro-17β-hydroxy-17α-ethinyl - 1,4 - androstadien-3-one 17-laurate, 6α-fluoro-17β-hydroxy-17α-ethinyl-1,4-androstadien-3-one 17-trimethylacetate, 6α-fluoro-17β-hydroxy-17α-ethinyl-1,4-androstadien-3-one 17-isobutyrate, 6α-fluoro-17β-hydroxy-17α-ethinyl-1,4-androstadien-3-one 17-isovalerate, 6α-fluoro-17β-hydroxy-17α-ethinyl-1,4-androstadien-3-one 17-cyclohexanecarboxylate, 6α-fluoro-17β-hydroxy-17α-ethinyl - 1,4 - androstadien-3-one 17-benzoate, 6α-fluoro-17β-hydroxy-17α-ethinyl-1,4-androstadien - 3 - one 17-phenylacetate, 6α-fluoro-17β-hydroxy-17α-ethinyl-1,4-androstadien-3-one 17-(β-phenylpropionate), 6α-fluoro-17β-hydroxy-17α-ethinyl-1,4-androstadien-3-one 17-(o-, m-, p-toluate), 6α-fluoro-17β-hydroxy-17α-ethinyl-1,4-androstadien-3-one 17-hemisuccinate, 6α-fluoro-17β-hydroxy-17α-ethinyl-1,4-androstadien-3-one 17-hemiadipate, 6α-fluoro-17β-hydroxy-17α-ethinyl-1,4-androstadien-3-one 17-acrylate, 6α-fluoro-17β-hydroxy-17α-ethinyl-1,4-androstadien-3-one 17-crotonate, 6α-fluoro-17β-hydroxy-17α-ethinyl - 1,4 - androstadien-3-one 17-undecylenate, 6α-fluoro-17β-hydroxy-17α-ethinyl-1,4-androstadien-3-one 17-propiolate, 6α-fluoro-17β-hydroxy-17α-ethinyl-1,4-androstadien-3-one 17-cinnamate, 6α-fluoro-17β-hydroxy-17α-ethinyl - 1,4 - androstadien-3-one 17-maleate, and 6α-fluoro-17β-hydroxy-17α-ethinyl-1,4-androstadien-3-one 17-citraconate.

If the corresponding acylating agent is solid, an inert solvent such as toluene, xylene or dioxane can be added to effect solution and to provide a liquid esterification medium.

Likewise, by reacting other 6α-fluoro-17β-hydroxy-17α-alkynyl-1,4-androstadien-3-ones with the appropriate hydrocarbon carboxylic acid, such as those named above, there are produced the 17-acylates of other 6α-fluoro-17β-hydroxy-17α-alkynyl-1,4-androstadien-3-ones such as, for example, the 17-propionate, the 17-hemisuccinate, and the 17-benzoate.

EXAMPLE 10

6α-fluoro-17β-hydroxy-17α-ethinyl-1,4-androstadien-3-one (II) (chemical dehydrogenation)

A mixture of 100 milligrams of 6α-fluoro-17β-hydroxy-17α-ethinyl-4-androsten-3-one (I) dissolved in six milliliters of tertiary butyl alcohol and 0.55 milliliter of acetic acid is heated together with thirty milligrams of selenium dioxide to approximately 75 degrees centigrade under stirring for a period of about 24 hours. Thereafter another thirty-milligram portion of selenium dioxide is added and the mixture heated under continuous stirring for a further period of about 24 hours. The mixture is then cooled, filtered to remove the selenium dioxide and evaporated. The residue is purified as described in Example 8 to give pure 6α-fluoro-17β-hydroxy-17α-ethinyl-1,4-androstadien-3-one (II), a crystalline solid.

Similarly, other 6α-fluoro-17β-hydroxy-17α-alkynyl-4-androsten-3-ones, for example, 6α-fluoro-17β-hydroxy-17α-methylethinyl-4-androsten-3-one, can be substituted for 6α-fluoro-17β-hydroxy-17α-ethinyl-4-androsten-3-one to obtain the corresponding 6α-fluoro-17β-hydroxy-17α-alkynyl-1,4-androstadien-3-ones, for example, 6α-fluoro-17β-hydroxy-17α-methylethinyl-1,4-androstadien-3-one.

EXAMPLE 11

6α-fluoro-17β-hydroxy-17α-ethinyl-1,4-androstadien-3-one 17-acetate (II) (chemical dehydrogenation)

Substituting 6α-fluoro-17β-hydroxy-17α-ethinyl-4-androsten-3-one 17-acetate (and other 6α-fluoro-17β-hydroxy-17α-alkynyl-4-androsten-3-one 17-acylates) for 6α-fluoro-17β-hydroxy-17α-ethinyl - 4 - androsten-3-one and following the procedure of Example 10 is productive of 6α-fluoro-17β-hydroxy-17α-ethinyl - 1,4 - androstadien-3-one 17-acetate (and other 6α-fluoro-17β-hydroxy-17α-alkynyl-1,4-androstadien-3-one 17-acylates).

EXAMPLE 12

6α-fluoro-17α-ethinylestradiol (III) (biological dehydrogenation)

Five 100-milliliter portions of a medium, in 250-milliliter Erlenmeyer flasks, containing one percent glucose, two percent corn steep liquor (sixty percent solids) and tap water, are adjusted to a pH of 4.9. This medium is sterilized for 45 minutes at fifteen pounds per square inch pressure and inoculated with a one to two day vegetative growth of Septomyxa affinis A. T. C. C. 6737. The Erlenmeyer flasks are shaken at room temperature (about 26 to 28 degrees centigrade) for a period of three days. At the end of this period this 500-milliliter volume is used as an inoculum for ten liters of the same glucose-corn steep liquor medium which in addition contains five milliliters of an antifoam compound (a mixture of lard oil and octadecanol). The fermentor is placed into the water-bath, adjusted to 28 degrees centigrade and the contents stirred thoroughly (300 R. P. M.) and aerated (0.2 liter of air per minute to ten liters of beer). After twenty hours of incubation, when a good growth has been developed, one gram of 6α-fluoro-17β-hydroxy-17α-ethinyl-19-nor-4-androsten-3-one (I) plus one-half gram of 3-ketobisnor-4-cholen-22-al in sixteen milliliters of dimethylformamide is added and the incubation carried out at the same temperature (28 degrees centigrade) and aeration for a period of 36 hours (final pH 8.3). The mycelium is filtered off and extracted with three 200-milliliter portions of acetone. The beer is extracted with three one-liter portions of methylene chloride and thereupon the acetone extracts and the extracts of the beer are combined, dried over anhydrous sodium sulfate and evaporated and the resulting residue chromatographed over a Florisil anhydrous magnesium silicate column, which on elution with increasing proportions of acetone in Skellysolve B hexanes and evaporation of the solvent affords solid residues. Those fractions soluble in ten percent aqueous sodium hydroxide are combined and recrystallized from acetone-Skellysolve B hexanes to give 6α-fluoro-17α-ethinylestradiol (III), a crystalline solid.

Instead of Septomyxa, species of other genera such as those described in Example 1 can be used to convert 6α-fluoro-17β-hydroxy-17α-ethinyl-19-nor - 4 - androsten-3-one to 6α-fluoro-17α-ethinylestradiol (III).

Similarly, other 6α-fluoro-17β-hydroxy-17α-alkynyl-19-nor-4-androsten-3-ones, for example, 6α-fluoro-17β-hydroxy-17α-methylethinyl-19-nor-4-androsten-3-one, can be substituted for 6α-fluoro-17β-hydroxy-17α-ethinyl-19-nor-4-androsten-3-one to obtain other 6α-fluoro-17α-alkynylestradioles, for example, 6α-fluoro-17α-methylethinylestradiol.

Instead of 6α-fluoro-17β-hydroxy-17α-ethinyl-19-nor-4-androsten-3-one (and other 6α-fluoro-17β-hydroxy-17α-alkynyl-19-nor-4-androsten-3-ones), the 17-esters thereof can be used such as the 17-acetate, the 17-propionate, the 17-butyrate, the 17-isobutyrate, and the like. However, in these cases the ester group is generally saponified during the fermentation process.

EXAMPLE 13

6α-fluoro-17α-ethinylestradiol (III) (chemical dehydrogenation)

A mixture of 100 milligrams of 6α-fluoro-17β-hydroxy-17α-ethinyl-19-nor-4-androsten-3-one (I) dissolved in six milliliters of tertiary butyl alcohol and 0.55 milliliter of acetic acid is heated together with thirty milligrams of selenium dioxide to approximately 75 degrees centigrade under stirring for a period of about 24 hours. Thereafter another thirty-milligram portion of selenium dioxide is added and the mixture heated under continuous stirring for a further period of about 24 hours. The mixture is then cooled, filtered to remove the selenium dioxide and evaporated. The residue is purified as described in Example 12 to give pure 6α-fluoro-17α-ethinylestradiol (III), a crystalline solid.

Similarly, other 6α-fluoro-17β-hydroxy-17α-alkynyl-4-androsten-3-ones, for example, 6α-fluoro-17β-hydroxy-17α-methylethinyl-4-androsten-3-one, can be substituted for 6α-fluoro-17β-hydroxy-17α-ethinyl-4-androsten-3-one to obtain the corresponding 6α-fluoro-17β-hydroxy-17α-alkynyl-1,4-androstadien-3-ones, for example, 6α-fluoro-17β-hydroxy-17α-methylethinyl-1,4-androstadien-3-one.

EXAMPLE 14

*6α-fluoro-17α-ethinylestradiol-17-acetate (III) (chemical dehydrogenation)*

Substituting 6α-fluoro-17β-hydroxy-17α-ethinyl-19-nor-4-androsten-3-one 17-acetate (and other 6α-fluoro-17β-hydroxy-17α-alkynyl-19-nor-4-androsten-3-one 17-acylates) for 6α-fluoro-17β-hydroxy-17α-ethinyl-19-nor-4-androsten-3-one and following the procedure of Example 13 is productive of 6α-fluoro-17α-ethinylestradiol 17-acetate (and other 6α-fluoro-17α-alkynylestradiol 17-acylates).

EXAMPLE 15

*The 6β-epimers*

A. Substituting 6β-fluoro-17β-hydroxy-17α-methyl-4-androsten-3-one (and the 17-acylates thereof) for the starting material in Example 1 and following the procedures of Examples 1 through 4 but maintaining near neutral conditions, there is produced respectively as the product of each example the corresponding 6β-steriod, for example, 6β-fluoro-17β-hydroxy-17α-methyl-1,4-androstadien-3-one (Examples 1 and 3), and 6β-fluoro-17β-hydroxy-17α-methyl-1,4-androstadien-3-one 17-acetate (and other 17-acylates thereof) (Examples 2 and 4).

B. Substituting 6β-fluoro-17β-hydroxy-17α-methyl-19-nor-4-androsten-3-one and the 17-acylates thereof for the starting material in Example 5 and following the procedures of Examples 5 through 7 but maintaining near neutral conditions, there is produced respectively as the product of each example the corresponding 6β-steroid, for example, 6β-fluoro-17α-methylestradiol (Examples 5 and 6), and 6β-fluoro-17α-methylestradiol 17-acetate (and other 17-acylates thereof) (Example 7).

C. Substituting 6β-fluoro-17β-hydroxy-17α-ethinyl-4-androsten-3-one (and the 17-acylates thereof) for the starting material in Example 8 and following the procedures of Examples 8 through 11 but maintaining near neutral conditions, there is produced respectively as the product of each example the corresponding 6β-steroid, for example, 6β-fluoro-17β-hydroxy-17α-ethinyl-1,4-androstadien-3-one (Examples 8 and 10), and 6β-fluoro-17β-hydroxy-17α-methyl-1,4-androstadien-3-one 17-acetate (and other 17-acylates thereof) (Examples 9 and 11).

D. Substituting 6β-fluoro-17β-hydroxy-17α-ethinyl-19-nor-4-androsten-3-one (and the 17-acylates thereof) for the starting material in Example 12 and following the procedures of Examples 12 through 14 but maintaining near neutral conditions, there is produced respectively as the product of each example the corresponding 6β-steroid, for example, 6β-fluoro-17α-ethinylestradiol (Examples 12 and 13), and 6β-fluoro-17α-ethinylestradiol 17-acetate (and other 17-acylates thereof) (Example 14).

EXAMPLE 16

*Isomerization of the 6β-fluoro steroids to the corresponding 6α-fluoro steroids*

Illustratively, this reaction is carried out as follows:
A solution of one gram of 6β-fluoro-17β-hydroxy-17α-methyl-1,4-androstadien-3-one in 100 milliliters of chloroform and 0.1 milliliter of alcohol is cooled to approximately minus ten degrees in an ice-salt bath and a stream of anhydrous hydrogen chloride is gently bubbled through the solution for about 2.5 hours whilst maintaining the temperature between approximately minus five and minus fifteen degrees centigrade. The solution is then washed with dilute sodium bicarbonate solution and water, dried over anhydrous sodium sulfate, and evaporated under reduced pressure. Crystallization of the residue from acetone-Skellysolve B hexanes yields 6α-fluoro-17β-hydroxy-17α-methyl-1,4-androstadien-3-one, of Example 1.

In a similar manner, other 6β-fluoro steroids, for example, 6β-fluoro-17β-hydroxy-17α-methyl-1,4-androstadien-3-one 17-acylates and 6β-fluoro-17β-hydroxy-17α-ethinyl-1,4-androstadien-3-one (and the 17-acylates thereof) can be converted to their corresponding 6α-analogues.

This application is a continuation-in-part of application Serial No. 699,502, filed November 29, 1957, now Patent No. 2,838,500 issued June 10, 1958.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A 6-fluoro-1-dehydro compound of the following formula:

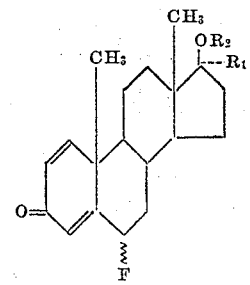

wherein $R^1$ is an alkyl radical containing from one to six carbon atoms, inclusive, and $R^2$ is selected from the group consisting of hydrogen and the acyl radical of an organic carboxylic acid containing from one to twelve carbon atoms, inclusive.

2. 6 - fluoro - 17β - hydroxy - 17α - alkyl - 1,4-androstadien-3-one in which the alkyl radical contains from one to six carbon atoms, inclusive.

3. 6 - fluoro - 17β - hydroxy - 17α - methyl - 1,4-androstadien-3-one.

4. 6α - fluoro - 17β - hydroxy - 17α - methyl-1,4-androstadien-3-one.

5. 6 - fluoro - 17β - hydroxy - 17α - alkyl - 1,4-androstadien-3-one 17-acylates in which the alkyl radical contains from one to six carbon atoms, inclusive, and the acyl radical is that of a hydrocarbon carboxylic acid containing from one to twelve carbon atoms, inclusive.

6. 6 - fluoro - 17β - hydroxy - 17α - methyl - 1,4-androstadien-3-one 17-acetate.

7. 6α - fluoro - 17β - hydroxy - 17α - methyl - 1,4-androstadien-3-one 17-acetate.

8. A 6-fluoro-1-dehydro compound of the following formula:

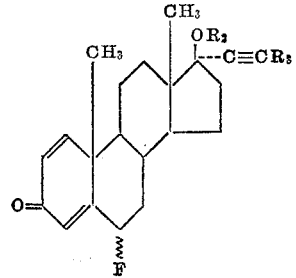

wherein $R_2$ is selected from the group consisting of hydrogen and the acyl radical of a hydrocarbon carboxylic acid containing from one to twelve carbon atoms, inclusive, and $R_3$ is selected from the group consisting of hydrogen and an alkyl radical containing from one to four carbon atoms, inclusive.

9. 6 - fluoro - 17$\beta$ - hydroxy - 17$\alpha$ - ethinyl - 1,4-androstadien-3-one.

10. 6$\alpha$ - fluoro - 17$\beta$ - hydroxy - 17$\alpha$ - ethinyl - 1,4-androstadien-3-one.

11. 6 - fluoro - 17$\beta$ - hydroxy - 17$\alpha$ - ethinyl - 1,4-androstadien-3-one 17-acylates in which the acyl radical is that of a hydrocarbon carboxylic acid containing from one to twelve carbon atoms, inclusive.

12. 6$\alpha$ - fluoro - 17$\beta$ - hydroxy - 17$\alpha$ - ethinyl - 1,4-androstadien-3-one 17-acetate.

13. A 6-fluoro compound of the following formula:

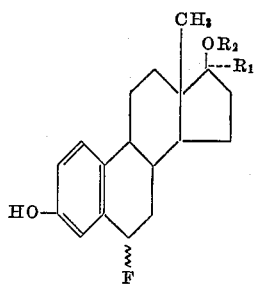

wherein $R_1$ is an alkyl radical containing from one to six carbon atoms, inclusive, and $R_2$ is selected from the group consisting of hydrogen and the acyl radical of a hydrocarbon carboxylic acid containing from one to twelve carbon atoms, inclusive.

14. 6 - fluoro - 17$\alpha$ - alkylestradiol in which the alkyl radical contains from one to six carbon atoms, inclusive.

15. 6-fluoro-17$\alpha$-methylestradiol.

16. 6$\alpha$-fluoro-17$\alpha$-methylestradiol.

17. 6 - fluoro - 17$\alpha$ - alkylestradiol 17 - acylates in which the alkyl radical contains from one to six carbon atoms, inclusive, and the acyl radical is that of a hydrocarbon carboxylic acid containing from one to twelve carbon atoms, inclusive.

18. 6 - fluoro - 17$\alpha$ - methylestradiol 17 - acetate.

19. 6$\alpha$ - fluoro - 17$\alpha$ - methylestradiol 17 - acetate.

20. A 6-fluoro compound of the following formula:

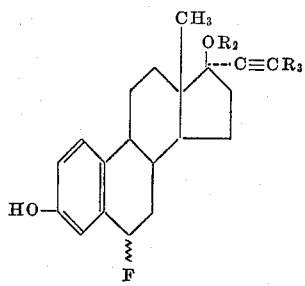

wherein $R_2$ is selected from the group consisting of hydrogen and the acyl radical of a hydrocarbon carboxylic acid containing from one to twelve carbon atoms, inclusive, and $R_3$ is selected from the group consisting of hydrogen and an alkyl radical containing from one to four carbon atoms, inclusive.

21. 6-fluoro-17$\alpha$-ethinylestradiol.

22. 6$\alpha$-fluoro-17$\alpha$-ethinylestradiol.

23. 6 - fluoro - 17$\alpha$ - ethinylestradiol 17-acylates in which the acyl radical is that of a hydrocarbon carboxylic acid containing from one to twelve carbon atoms, inclusive.

24. 6$\alpha$-fluoro-17$\alpha$-ethinylestradiol 17-acetate.

No references cited.